(12) United States Patent
Wang

(10) Patent No.: US 9,658,757 B2
(45) Date of Patent: May 23, 2017

(54) METHOD AND DEVICE FOR MANAGING PROGRESS INDICATOR DISPLAY

(71) Applicant: Tencent Technology (Shenzhen) Company Limited, Shenzhen (CN)

(72) Inventor: Yulong Wang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 363 days.

(21) Appl. No.: 14/615,338

(22) Filed: Feb. 5, 2015

(65) Prior Publication Data
US 2015/0153943 A1    Jun. 4, 2015

Related U.S. Application Data

(63) Continuation of application No. PCT/CN2014/082811, filed on Jul. 23, 2014.

(30) Foreign Application Priority Data

Sep. 4, 2013 (CN) .......................... 2013 1 0399778

(51) Int. Cl.
G06F 3/0484 (2013.01)
G06F 3/0486 (2013.01)
H04N 21/472 (2011.01)

(52) U.S. Cl.
CPC ........ G06F 3/04847 (2013.01); G06F 3/0486 (2013.01); H04N 21/47217 (2013.01)

(58) Field of Classification Search
CPC ............ H04N 21/47217; G06F 3/0486; G06F 3/04847; H04L 29/06462
See application file for complete search history.

(56) References Cited

U.S. PATENT DOCUMENTS 7,827,490 B2 * 11/2010 Kapur ................. G06F 3/04847
                                                                 715/716
9,264,776 B2 *  2/2016 Jung ................. H04N 21/47217
(Continued)

FOREIGN PATENT DOCUMENTS

CN        101814040 A       8/2010
CN        101944204 A       1/2011
(Continued)

OTHER PUBLICATIONS

Tencent Technology (Shenzhen) Co Ltd., IPRP, PCT/CN2014/082812, Mar. 8, 2016, 5 pgs.
(Continued)

Primary Examiner — Alvin Tan
(74) Attorney, Agent, or Firm — Morgan, Lewis & Bockius LLP

(57) ABSTRACT

The present application discloses methods and devices that are used to improve the display of a progress indictor for a program, such as an audio/video player application. A progress indicator on a progress bar is often used for the indication of the progress of a program. There may also be one or more status indicators on the progress bar. When a user drags the progress indicator along or within the progress bar and passes one or more status indicators, the computer system displays an indicating image between the starting position and the drag position in the progress bar for a pre-defined period of time. The indicating image can be generated by combining a layer associated with the progress indicator and layers associated with one or more status indicators that are passed. The current method and device make the display of progress indictor more distinctive and improve user experience.

20 Claims, 7 Drawing Sheets

(56) References Cited

U.S. PATENT DOCUMENTS

| | | | |
|---|---|---|---|
| 2007/0136679 A1* | 6/2007 | Yang | H04N 5/44513 |
| | | | 715/772 |
| 2010/0313158 A1 | 12/2010 | Lee et al. | |
| 2012/0210447 A1 | 8/2012 | Vazquez et al. | |
| 2013/0097508 A1 | 4/2013 | Matejka et al. | |
| 2015/0312369 A1* | 10/2015 | Birch | G11B 20/10527 |
| | | | 709/213 |

FOREIGN PATENT DOCUMENTS

| | | |
|---|---|---|
| CN | 103021439 A | 4/2013 |
| CN | 103118293 A | 5/2013 |

OTHER PUBLICATIONS

Tencent Technology (Shenzhen) Co Ltd., ISRWO, PCT/CN2014/082812, Oct. 27, 2014, 8 pgs.

* cited by examiner

METHOD AND DEVICE FOR MANAGING PROGRESS INDICATOR DISPLAY

RELATED APPLICATIONS

This application is a continuation application of PCT Patent Application No. PCT/CN2014/082811, entitled "METHOD AND DEVICE FOR MANAGING PROGRESS INDICATOR DISPLAY" filed on Jul. 23, 2014, which claims priority to Chinese Patent Application No. 201310399778.X, "METHOD AND DEVICE FOR MANAGING PROGRESS INDICATOR DISPLAY," filed on Sep. 4, 2013, both of which are hereby incorporated by reference in their entirety.

TECHNICAL FIELD

The present application generally relates to the indication of progress for play sessions, in particular to method and device for managing progress indicator display.

BACKGROUND

In mobile technology, terminals such as smart phones or tablet computers can bring convenience to users by playing audio or video files using an audio or video player play session. In particular, with the development of wireless communication technology, more and more users can play audio/video files online, making it possible to obtain information conveniently at anytime and anywhere.

When acquiring an audio/video file online, a mobile terminal with a player program usually displays a progress indicator that can be dragged by the user and one or more status indicators such as a buffering indicator. The progress indictor demonstrates the progress of the player program when a file is being played; the buffering indicator shows the progress of data buffering or acquisition of the online audio/video file. Sometimes there are other status indicators such as timers that can be used to distinguish different segments in a progress bar.

However, the buffering indicator generally illustrates a buffering region and a non-buffering region, and the progress indicator generally shows the progress on a progress bar. Because the buffering indicator and the progress indicators are used independently, there is no implementation that shows the progress of player and buffering progress on a progress bar. When the progress indicator and the progress bar have similar colors, it is more difficult to demonstrate the progress of the player. Dragging operations conducted to the progress indictor cannot be shown distinctively, reducing the efficiency of the operations and sometimes causing additional power consumption for the mobile terminal.

SUMMARY

The above deficiencies and other problems associated with the existing technology are reduced or eliminated by the application disclosed below. In some embodiments, the application is implemented in a computer system that has one or more processors, memory and one or more modules, programs or sets of instructions stored in the memory for performing multiple functions. Instructions for performing these functions may be included in a computer program product configured for execution by one or more processors.

One aspect of the application involves a computer-implemented method performed by a computer system displaying a progress indicator and one or more status indicators positioned on a progress bar for a play session. The computer system may detect a starting position of the progress indicator along the progress bar and the respective positions of the one or more status indicators. After detecting a drag operation to the progress indictor and a drag position of the progress indicator, the computer system may displaying an indicating image between the starting position and the drag position in the progress bar for a pre-defined period of time when there is one or more respective positions of the status indicators between the starting position and the drag position, wherein the progress indicator has a corresponding progress layer and a drag layer and the one or more status indicators have respective corresponding status layers, and the indicating image is generated by combining the drag layer and one or more status layers having corresponding status indicators with positions between the starting position and the drag position. The computer system may display the progress layer between an initiating position of the progress bar and the drag position after the pre-defined period.

Another aspect of the application involves a computer system displaying a progress indicator and one or more status indicators positioned on a progress bar for a play session. The computer system includes memory, one or more processors, and one or more program modules stored in the memory and configured for execution by the one or more processors. The one or more program modules include: a first detecting module configured to detect a starting position of the progress indicator along the progress bar and the respective positions of the one or more status indicators; a second detecting module configured to detect a drag operation to the progress indictor and a drag position of the progress indicator; a first display module configured to display an indicating image between the starting position and the drag position in the progress bar for a pre-defined period of time when there is one or more respective positions of the status indicators between the starting position and the drag position, wherein the progress indicator has a corresponding progress layer and a drag layer and the one or more status indicators have respective corresponding status layers, and the indicating image is generated by combining the drag layer and one or more status layers having corresponding status indicators with positions between the starting position and the drag position; and a second display module configured to display the progress layer between an initiating position of the progress bar and the drag position after the pre-defined period.

Another aspect of the application involves a non-transitory computer readable storage medium having stored therein instructions, which when executed by a computer system displaying a progress indicator and one or more status indicators positioned on a progress bar for a play session, cause the computer system to: detect a starting position of the progress indicator along the progress bar and the respective positions of the one or more status indicators; detect a drag operation to the progress indictor and a drag position of the progress indicator; display an indicating image between the starting position and the drag position in the progress bar for a pre-defined period of time when there is one or more respective positions of the status indicators between the starting position and the drag position, wherein the progress indicator has a corresponding progress layer and a drag layer and the one or more status indicators have respective corresponding status layers, and the indicating image is generated by combining the drag layer and one or more status layers having corresponding status indicators with positions between the starting position and the drag position; and display the progress layer between an initiating position of the progress bar and the drag position after the pre-defined period.

BRIEF DESCRIPTION OF THE DRAWINGS

The aforementioned features and advantages of the present application as well as additional features and advantages thereof will be more clearly understood hereinafter as a result of a detailed description of preferred embodiments when taken in conjunction with the drawings.

FIG. 2C also shows a sample progress layer, a sample drag layer, and a sample indicator layer.

Like reference numerals refer to corresponding parts throughout the several views of the drawings.

DESCRIPTION OF EMBODIMENTS

Figure 1A:
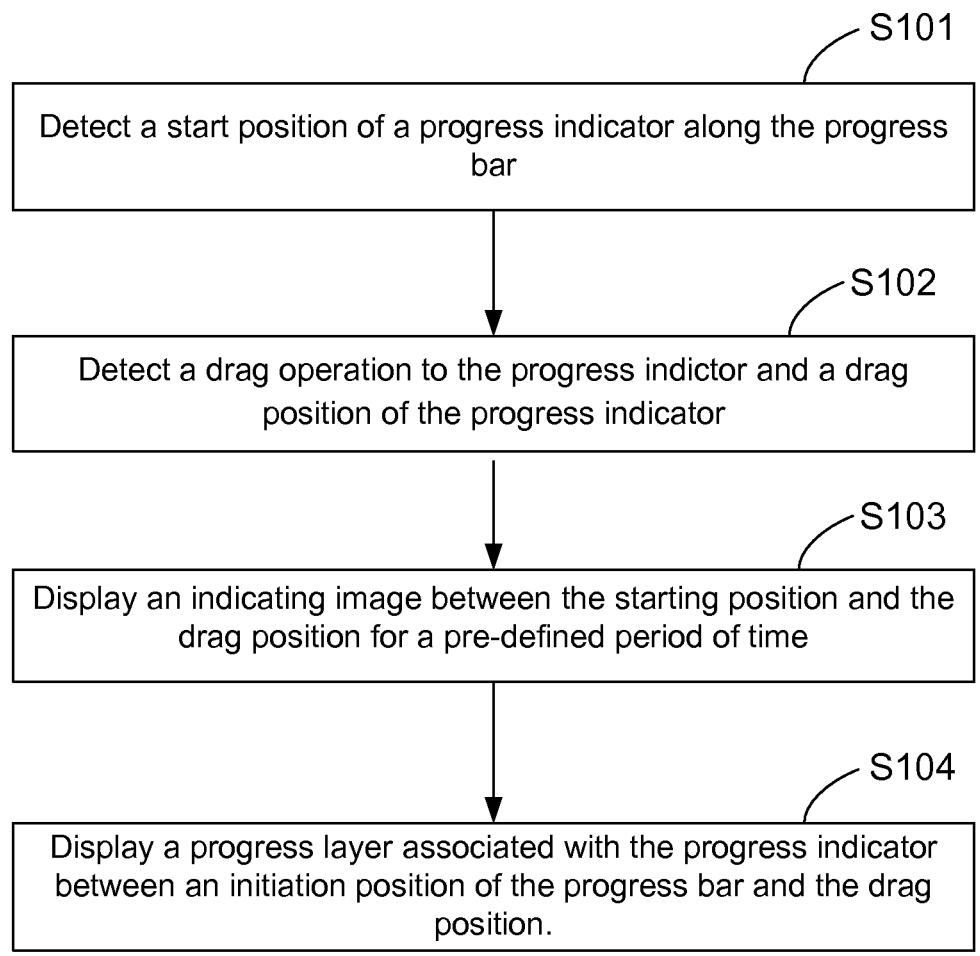
FIG. 1A is a flowchart illustrative of a method for managing progress indicator display in accordance with some embodiments of the current application.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The computer system herein can be any device having computational and displaying capabilities. For example, the computer system may be servers, workstations, personal computers such as laptops and desktops, and mobile devices such as smart phones and tablet computers. The computer system may also include multiple computing devices functionally integrated. In some embodiments, the computer system has a touch screen, which is an electronic visual display that the user can control through touching the screen-touch gestures. In some embodiments, the computer system can be controlled by a mouse and/or a keyboard.

With certain kinds of applications, such as video and audio players, the computer system can play or display certain files. Here, a play session refers to such a play or display process, where the application handles one or more files. Examples for play sessions may include: a video file being played by a video player, an audio file being played by an audio player, and a number of slides being shown sequentially. When a play session is started, through the application playing the session and a user interface, the computer system usually provides controlling elements that can be utilized by a user to control the progress of the play session. The controlling elements may include a number of components such as virtual buttons and keys such as forward, backward, stop, pause and play. In some embodiments, the user interface may also include a progress bar and a progress indicator. In some embodiments, the progress bar illustrates the time frame for the play session; and the progress indicator, with its position on the progress bar, indicates the progress of the play session.

In some embodiments, certain applications provide user interface components to allow the user to adjust certain parameters for a play session or other functionalities. For example, the user interface components may include an adjustment bar and an adjustment indicator, where the adjustment bar provides an indication for the entire adjustable range and the adjustment indicator provides an indication for the current value of the parameter. A typical adjustment bar—adjustment indicator combination can be used to control parameters such as sound volume. In the current application, the embodiments applying to the progress bar and progress indicator (e.g. drag operations and display methods) can also apply to the adjustment bar and adjustment indicator.

In additions to the progress indicator, there may also be other indicators, such as status indicators that can be positioned on the progress bar according to the embodiments of the present application. For example, the display of the data buffering function can also be incorporated in the progress bar, being shown as a status indicator. Other status indicators may include timer indicators, which marks specific time points on the progress bar. Similarly, there may also be status indicators on the adjustment bar. For example, there can be status indicators showing 20%, 40%, 60%, 80% and 100% volume on a sound volume adjustment bar.

The implementation of the present application may be used in various software or applications and may be applied to application software or programs in various computer systems such as mobile terminals. The methods and devices herein disclosed may enhance the display of the progress indicator and progress bar, show the progress of the play session more clearly, and improve operation efficiency.

Detailed explanation may be made with some embodiments of the present application.

FIG. 1A is a flowchart illustrative of a method for managing progress indicator display in accordance with some embodiments of the current application.

As shown by step S101 of FIG. 1A, the computer system may detect a start position of a progress indicator along the progress bar and the respective positions of one or more status indicators.

The progress bar illustrates the entire time frame (e.g. hour-minute-second) or possible progress (e.g. total n slides) of the play session. The progress bar has an initiating position and a terminating position, serving to indicate the starting and ending of the play session. Although the progress bar can be an elongated strip structure, it can also have other shapes. In some embodiments, the progress bar is based on basic shapes such as but not limited to: circle, oval, rectangle, square, diamond, star, pentagon, hexagon, and trapezoid. The progress bar may also be combinations of the basic shapes. As long as the progress bar, in combination with a progress indicator, is capable of illustrating the progress of the play session, the progress bar can be any regular or irregular shape.

The progress indicator indicates the progress of the play session. In particular, the position (coordinate) of the progress indicator on the progress bar provides an indication for the time point (e.g. hour-minute-second) or current progress (e.g. slide y) of the play session. The status indicators are indicators for specific properties or characteristic associated with the play session. For example, the buffering indicator indicates the data buffering progress for the play session. Timer indicators can provide markers for specific time points (e.g. 5 minutes, 10 minutes). The progress indicator and status indicators may utilize any shape and size. In some embodiments, the progress indicator and/or status indicators are based on basic shapes such as but not limited to: circle, oval, rectangle, square, diamond, star, pentagon, hexagon, and trapezoid. The progress indicator and status indicators may also be combinations of the basic shapes. As long as the progress indicator and status indicators, in combination with a progress bar, are capable of illustrating the progress of the play session and showing the designated status, the progress indicator and status indicators can be any regular or irregular shape.

In the user interface, the progress bar may be positioned in any orientation. In some embodiments, the progress bar may be an elongated strip that is positioned horizontally. FIGS. 1A, 1B, 2B, 2C, 2D and 3B show examples of the current method with such a progress bar. The descriptions of the current application also match the showing of a progress bar positioned horizontally. However, it should be noted that since the progress bar can be any shape, the progress of the play session can be displayed and indicated in any manner as long as it is clear to a user. For example, the progress bar can have a reverse trapezoid shape that is displayed vertically. For another example, the progress bar may be a circle with an overlapping initiation position and terminating position.

As indicated, the features and variations of the progress bar and progress indicator can also be applied to the adjustable bar and adjustable indicator. For example, while the adjustment bar shows a total sound volume range of 100%, the position of the adjustment indicator on the adjustment bar provides an indication for the current sound volume level, e.g. positioning of the adjustment indicator at 45% of the total length of the adjustment bar to the initiation position indicates that the current volume is 45% of the total volume.

The starting position of the progress indicator is the position that can be used to indicate the progress of the play session before drag operation. Generally, the position of the progress indicator may be represented with X-axis coordinate with respect to a progress bar arranged horizontally, and may be represented with Y-axis coordinate with respect to a progress bar arranged vertically, and may be represented with (x, y) with respect to a progress indicator arranged not in horizontal direction and vertical direction. The embodiments in the current application are described with progress bar in horizontal direction, and others are similar to this example.

As shown by step S102 of FIG. 1A, the computer system may detect a drag operation to the progress indictor and a drag position of the progress indicator.

In some embodiments, a drag operation can be conducted to the progress indicator and a user can drag the progress indicator along or within the progress bar to change the progress of the play session. In some embodiments, the drag operation not only includes operations that the user drags (click-move-and-release) the progress indicator, but also other operations conducted by the user to manually change the progress of the play session. For example, when the user clicks a position on the progress bar, the progress indicator may be re-positioned to the clicked position and such an operation may also be considered a drag operation. The drag operation can be conducted with a mouse or with finger and other touch devices, e.g. stylus.

The starting position and drag position of the progress indicator can be determined by a specific point on the progress indicator. If the progress indicator has a symmetric shape, the point can be a center point of the shape. In some embodiments, when the progress indicator is relatively small compared with progress bar, the size of the progress indicator can be ignored. The drag position may vary when the progress indicator is being dragged. Therefore, the drag position starts the same as the starting position and ends with an ending position. The ending position is the position of the progress indicator when the drag operation is completed.

Figure 1B:
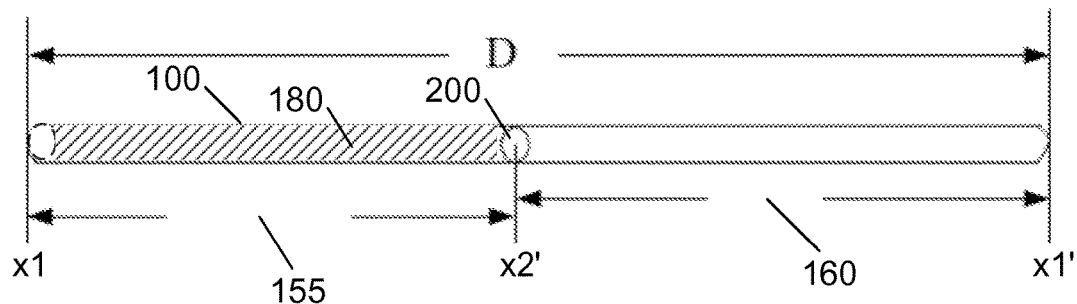
FIGS. 1B and 1C are schematic diagrams of the progress indicator and the progress bar in accordance with some embodiments of the current application.
Figure 1C:
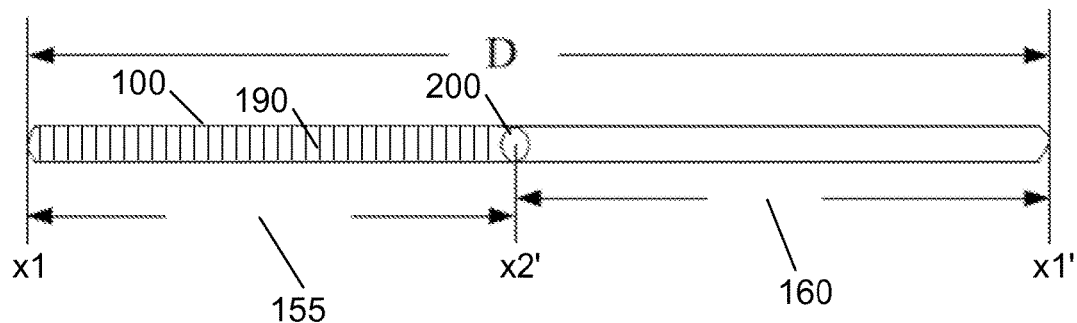

FIGS. 1B and 1C are schematic diagrams of the progress indicator and the progress bar in accordance with some embodiments of the current application.

As shown in FIG. 1B, the progress bar 100 has an overall length D from the initiating position x1 to the terminating position x1', the progress indicator 200 has a drag position of x2'. The dotted progress indicator shows the starting position of the progress indicator and the solid progress indicator 200 shows the drag position of the progress indicator. In FIG. 1B, the starting position of the progress indicator 200 overlaps with the initiating position of the progress bar 100. This embodiment, therefore, reflects a situation when the progress indicator 200 is being dragged at the start of a play session. The section of the progress bar 100 between the starting position x1 and the drag position x2' can be defined as drag section 155. The remaining part of the progress bar 100 can be defined as the remaining section 160.

The progress indicator can be set up so that the progress indicator has a corresponding progress layer and a corresponding drag layer. A "layer" can be a picture or image that is adjustable or not. Different layers can be combined according to preset rules. In some embodiments, the progress layer and/or the drag layer are constructed or selected by a user of the computer system. In some embodiments, the progress layer and/or the drag layer are selected by the user from a collection of selectable layers. The progress layer shows the progress of the play session. In some embodiments, the progress layer is visually distinctive from the drag layer. In some embodiments, the layer of an indicator is visually distinctive from the frame of the progress bar. Visual distinction can be achieved by parameters such as but not limited to color, brightness, contrast, and pattern.

As shown by step S103 of FIG. 1A, the computer system may display an indicating image between the starting position and the drag position for a pre-defined period of time. The indicating image can be generated by using a particular layer and/or a combination of different layers.

FIG. 1B shows that the drag section 155 of the progress bar displays the drag layer 180 corresponding to the progress indicator. Here, the indicating image is the drag layer 180. In some embodiments, the drag layer 180 can be shown for a pre-defined period of time. For example, the pre-defined period can be the period when the drag operation is being conducted. Therefore, when the user begins to drag the progress indicator 200, the section of the progress bar 100 between the starting position and the drag position displays the drag layer 180 before the user releases the progress indicator 200 and the drag position reaches the ending position. Alternatively, the predefined period can be any period defined by the user or set up as a default by the application. For example, the predefined period can be a fixed time, e.g. 2 seconds, after the starting or the ending of the drag operation. For example, the predefined period can vary based on the starting position or ending position of the drag operation, e.g. 1/100 of the play time indicated by the starting position or ending position. In some embodiments, the predefined period can be infinitely large, making the display stable. The remaining section 160 can be empty or display a preset layer.

As shown by step S104 of FIG. 1A, the computer system may display a progress layer associated with the progress indicator between an initiation position of the progress bar and the drag position.

FIG. 1C shows that after the pre-defined period of time, the drag section 155 displays the progress layer associated with the progress indicator. The remaining section 160 can be empty or can display a preset layer.

Figure 2A:
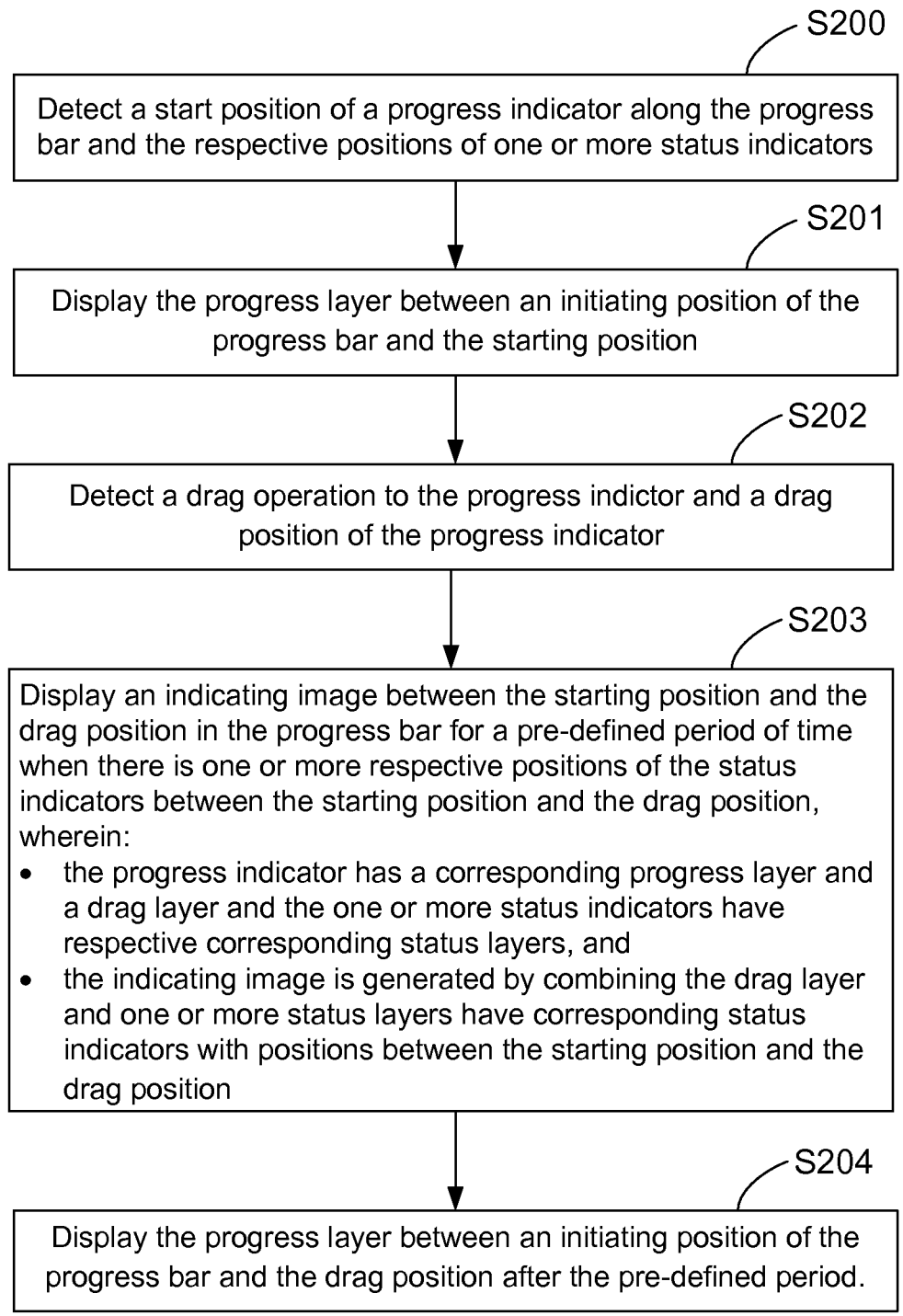
FIG. 2A is a flowchart illustrative of a method for managing progress indicator display in accordance with some embodiments of the current application.
Figure 2B:
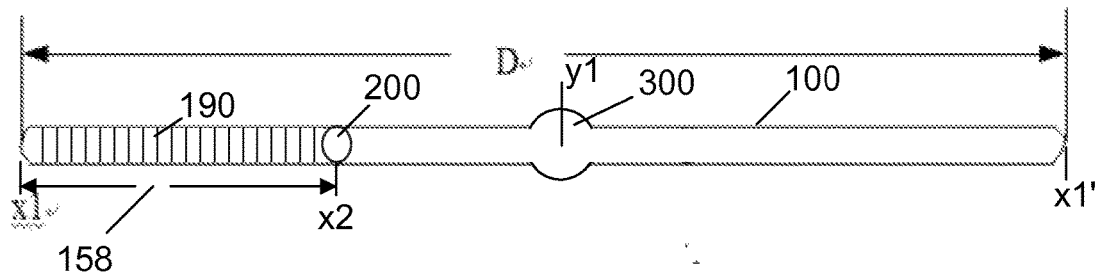
FIGS. 2B, 2C and 2D are schematic diagrams of the progress indicator, a status indicator and the progress bar in accordance with some embodiments of the current application.
Figure 2C:
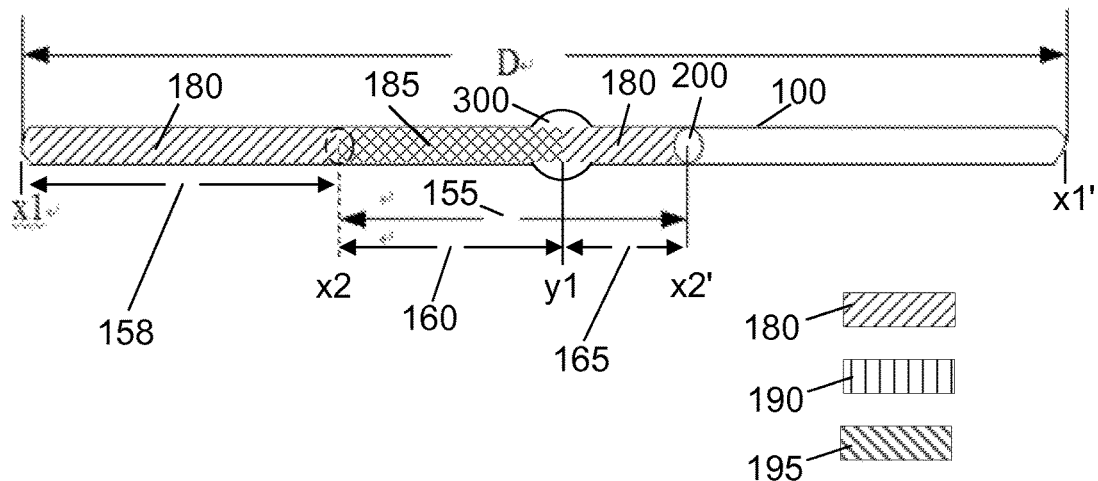
Figure 2D:
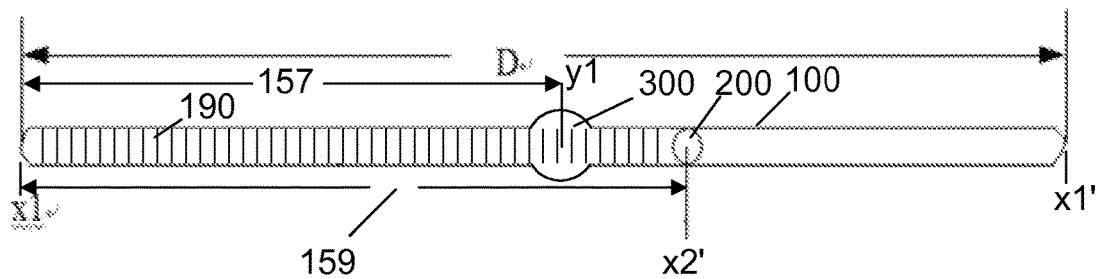

FIG. 2A is a flowchart illustrative of a method for managing progress indicator display in accordance with some embodiments of the current application. FIGS. 2B, 2C and 2D are schematic diagrams of the progress indicator, a status indicator and the progress bar in accordance with some embodiments of the current application. FIG. 2C also shows a sample progress layer, a sample drag layer, and a sample indicator layer.

As shown by step S200 of FIG. 2A, the computer system may detect a start position of a progress indicator along the progress bar and the respective positions of one or more status indicators. As shown by step S201 of FIG. 2A, the computer system may display the progress layer between an initiating position of the progress bar and the starting position.

As shown in FIG. 2B, the progress bar 100 has an overall length D from the initiating position x1 to the terminating position x1' and the progress indicator 200 has a start position x2. In FIG. 2B, the starting position of the progress indicator 200 does not overlap with the initiating position x1 of the progress bar 100. This embodiment, therefore, reflects a situation when the progress indicator 200 is being dragged not at the start of a play session. The section of the progress bar 100 between the initiating position x1 and the starting position x2 can be defined as starting section 158.

There is a status indicator 300 positioned on the progress bar 100 at position y1. The status indicator 300 is an example and there can be more status indicators. In some embodiments, the status indicator 300 may be a buffering indicator showing data buffering progress. In some embodiments, the status indicator 300 may be used to indicate other parameters such as time intervals.

As shown in FIG. 2B, the progress indicator 200 is behind the status indicator 300. Here, being "behind" on a progress bar is when the indicator is closer to the initiating position of the progress bar; being "in front" on a progress bar is when the indicator is farther from the initiating position of the bar. Therefore, the status indicator 300 is in front of the progress indicator 200 when the progress indicator is at the starting position shown in FIG. 2B. For the adjustment bar, the adjustment indicator and status indicators, being "behind" is when the indicator is closer to the initiating position, e.g. minimum end, of the range.

As shown in FIG. 2B, the starting section 158 displays a progress layer associated with the progress indicator 200.

Referring to FIG. 2C, which shows three layers separately: the progress layer 190 and the drag layer 180 associated with the progress indicator 200; and the status layer associated with the status indicator 300. FIG. 2B shows that before the progress indicator 200 is being dragged, the starting section 158 can display the progress layer 190. As indicated, the progress layer 190 can be selected or constructed by a user of the computer system.

As shown by step S202 of FIG. 2A, the computer system may detect a drag operation to the progress indictor and a drag position of the progress indicator.

As shown in FIG. 2C, the progress bar 100 has an overall length D from the initiating position x1 to the terminating position x1', the progress indicator 200 has a start position x2 and a drag position x2'. The dotted progress indicator shows the starting position of the progress indicator and the solid progress indicator 200 shows the drag position of the progress indicator. In FIG. 2C, the section of the progress bar 100 between the starting position x1 and the drag position x2' can be defined as drag section 155. The section between the initiating position x1 of the progress bar 100 and the starting position x2 can be defined as the starting section 158.

As shown in FIG. 2C, the starting position x2 of the progress indicator 200 is behind the position y1 of the status indicator 300; and the drag position x2' of the progress indicator 200 is in front of the position y1 of the status indicator 300. Therefore, the progress indicator 200 has been dragged to pass the status indicator 300 from behind to the front. It can also be easily envisioned that the progress indicator can be dragged to pass a status indicator from the front to behind. The section between the starting position x2 and the position of the status indicator 300 can be defined as a first section 160; the section between the position y1 of the status indicator 300 and the drag position x2' can be defined as the second section 165. Here, the drag section 155 comprises the first section 160 and the second section 165.

As shown by step S203 of FIG. 2A, the computer system may display an indicating image between the starting position and the drag position in the progress bar for a predefined period of time when there is one or more respective positions of the status indicators between the starting position and the drag position. In some embodiments, the progress indicator has a corresponding progress layer and a drag layer and the one or more status indicators have respective corresponding status layers. In some embodiments, the indicating image is generated by combining the drag layer and one or more status layers having corresponding status indicators with positions between the starting position and the drag position.

Here, being "combined" means that the layers are used as sources to generate the indicating image. In some embodiments, the layers are combined by conducting one or more of the operations: selecting, overlaying, fusing, color mixing, pattern mixing, paralleling, adjusting contrast, feathering, adjusting sharpness, adjusting transparency, removing, rotating, adjusting size, changing color, and adding text. In some embodiments, the indicating image can be divided into sections, wherein some sections incorporate only one layer and some sections incorporate more than one layer. However, in some embodiments, all the indicated layers are used to generate at least part of the indicating image. The specific operations for combining the layers can be set up automatically by the application or the operation system or by the user through selecting various preset operations.

As shown in FIG. 2C, the indicating images includes the drag section 155, which comprises the first section 160 and the second section 165. The indicating image is generated by combining the drag layer 180 and the status layer 195. In particular, the indicating image includes two parts which are displayed in the first section 169 and the second section 165. Here, the part of the indicating image displayed in the first section 160 is generated by overlaying the drag layer 180 and the status layer 195; the part of the indicating image displayed in the second section 165 is generated by applying only the drag layer 180.

As indicated, there are various approaches to combine the layers. For example, the layers can be arranged in parallel and along the intended sections in the progress bar. Specifically, the progress layer can occupy the upper or lower part of the intended section and the status layer can occupy the lower or upper part of the intended section. In some embodiments, the layers are combined with adjusted transparency. For example, two layers can be adjusted by to 50% of the original transparency before one layer is masked over the other. In some embodiments, as shown in FIG. 2C, the drag layer 180 and the status layer 195 are combined by pattern mixing to generate part 185 of the indicating image.

As indicated, there may be more status indicators on the progress bar. Therefore, when the progress indicator is being dragged, the progress indicator may pass more than one status indicators. For example, if the progress indicator is dragged to pass a first, a second, and a third indicator, in respective order, the drag section can be divided into four sections: between starting position and first status indicator, between first status indicator and second status indicator, between second status indicator and third status indicator, and between third status indicator and the drag position. An indicating image can be displayed during a pre-defined period of time, e.g. during the drag operation, between the starting position and the drag position. The indicating image can be divided into different parts that can be displayed in the different sections. For example, the part of the indicating image between the starting position and the first status indicator can be generated by overlaying the drag layer with a status layer corresponding to the first status indicator; the part of the indicating image between the first status indicator and the second status indicator can be generated by overlaying the drag layer with a status layer corresponding to the second status indicator; the part of the indicating image between the second status indicator and the third status indicator can be generated by overlaying the drag layer with a status layer corresponding to the third status indicator; and the part of the indicating image displayed between the third status indicator and the progress indicator can be generated by using the drag layer.

It should also be noted that there may be variations and flexibilities as to how the indicating image is generated. For example, referring to FIG. 2C without the specific layers used, the indicating image between the starting position x2 and the drag position x2' can be an image that displays the drag layer 180 or the status layer 190 of the status indicator 300. In particular, the indicating image may comprise the status layer 190 and such an approach may show the user that a specific status indicator has been passed. Similarly, when there are more than one status indicators that have been passed, the indicating image may be divided into different sections that show the respective status layers of the status indicators.

In addition to the display shown in FIG. 2C, other information, patterns, images and also be displayed. For example, when the status indicator is used for indicating data buffering progress for the play session, and when the starting position is behind the position of the buffering indicator and the drag position is in front of the position of the buffering indicator, the computer system may display a warning message indicating that progress indicator is surpassing the data buffering progress of the play session. The warning message may be integrated into the indicating image; the warning message may be displayed beside and adjacent to the progress bar; or the warning message may be displayed separately. The warning message may also be displayed in the remaining section of the progress bar.

As shown by step S204 of FIG. 2A, the computer system may display the progress layer between an initiating position of the progress bar and the drag position after the pre-defined period.

As shown by FIG. 2D, the progress bar 100 has an overall length D from the initiating position x1 to the terminating position x1' and the progress indicator 200 is on a drag position x2'. FIG. 2D illustrates the display after the pre-defined period of time. In some embodiments, as shown in FIG. 2D, the section between the initiating position x1 and the drag position x2' can be defined as a post-drag section 159, which displays the progress layer 190. When the predefined period is the duration of the drag operation, the drag position x2' is the ending position of the drag operation. Such an approach means that after the drag operation, the display of the progress bar reverts back to the pattern shown by FIG. 2B, which is before the drag operation, wherein the section between the initiating position and the position of the progress indicator displays the progress layer.

It should also be noted that other embodiments may present different display schemes after the predefined period. For example, referring to FIG. 2D without the specific layers, after the drag operation, the progress bar 100 displays the progress layer 190 in section 157 between the initiating position x1 and the position y1 of the status indicator 300; and the progress bar 100 displays an image overlaying the progress layer 190 and the status layer 195 corresponding to the status indicator 300 in the section between position y1 and the drag position x2'. Alternatively, after the drag operation, the progress bar 100 displays an image overlaying the progress layer 190 and the status layer 195 corresponding to the status indicator 300 in section 157 between the initiating position x1 and the position y1 of the status indicator 300; and the progress bar 100 displays the progress layer 190 in the section between position y1 and the drag position x2'. Other variations may also apply.

Figure 3A:
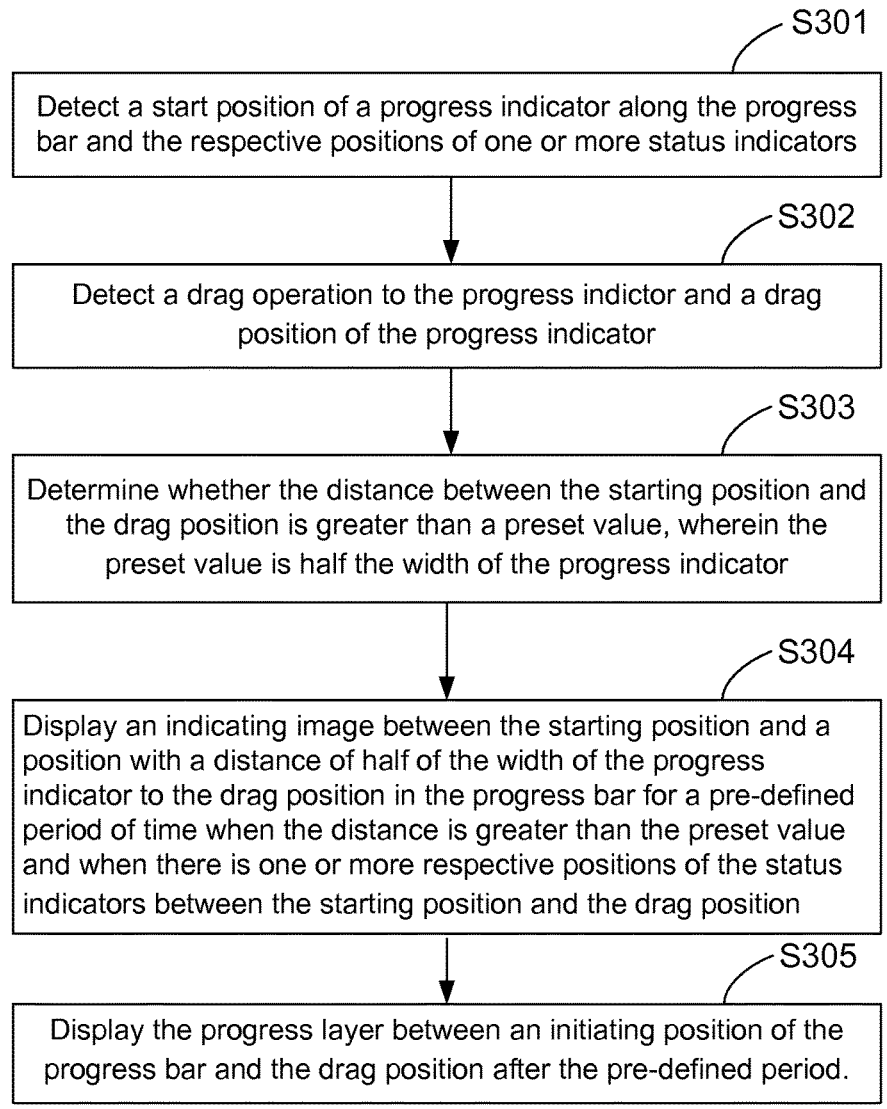
FIG. 3A is a flowchart illustrative of a method for managing progress indicator display in accordance with some embodiments of the current application.
Figure 3B:
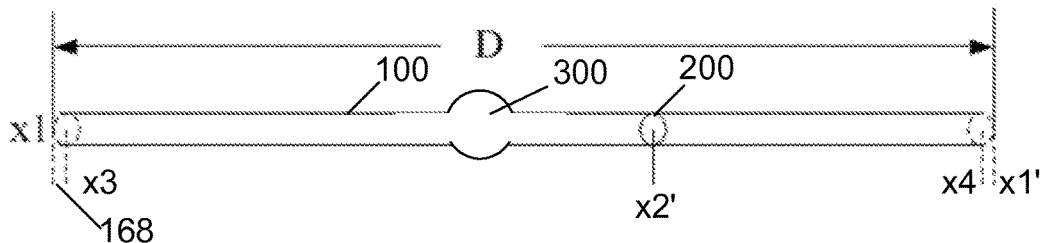
FIG. 3B is a schematic diagram of the progress indicator and the progress bar in accordance with some embodiments of the current application.

FIG. 3A is a flowchart illustrative of a method for managing progress indicator display in accordance with some embodiments of the current application. FIG. 3B is a schematic diagram of the progress indicator and the progress bar in accordance with some embodiments of the current application. FIGS. 3A and 3B take into consideration the width of the progress indicator and refines the display method and the embodiments described above.

As shown by step S301 of FIG. 3A, the computer system may detect a start position of a progress indicator along the progress bar and the respective positions of one or more status indicators.

As shown by step S302 of FIG. 3A, the computer system may detect a drag operation to the progress indictor and a drag position of the progress indicator.

As shown by step S303 of FIG. 3A, the computer system may determine whether the distance between the starting position and the drag position is greater than a preset value, wherein the preset value is half the width of the progress indicator.

As shown by FIG. 3B, where the progress bar 100 is shown without the layers indicating the progress of the play session. On the progress bar 100 are the progress indicator 200 and the status indicator 300. The dotted progress indicator shows possible positions of the progress indicator when it is right next to the initiating position x1 and the terminating position x1' of the progress bar 100. The solid progress indicator 200 shows the drag position of the progress indicator. The progress indicator 200 has a width and half the width can be illustrated as the distance between the initiating position x1 and the center position x3 of the progress indicator when the progress indicator is right next to the initiating position x. The half-width is shown as section 168.

When the progress indicator has a width, especially when the width is relatively substantial, in some embodiments it would be difficult to show the indicating image when the progress indicator is not dragged very far. In some embodiments, when the distance between the starting position and the drag position is less than or equal to the half-width 168, the indicating image cannot be displayed. Therefore, in some embodiments, the indicating image is only displayed when the distance between the starting position and the drag position is greater than the half-width. For the entire progress bar, not all the space is available for displaying because the progress indicator can only be dragged from position x3 to position x4. Therefore, the maximum area for the drag section can be from x1 to x4 when the progress indicator is dragged all the way to the front, or from x1' to x3 when the progress indicator is dragged all the way behind. In such embodiments, the maximum display cannot be D.

As shown by step S304 of FIG. 3A, the computer system may display an indicating image between the starting position and a position a half-width from the drag position in the progress bar for a pre-defined period of time when the distance is greater than the preset value and when there is one or more respective positions of the status indicators between the starting position and the drag position.

As shown by step S305 of FIG. 3A, the computer system may Display the progress layer between an initiating position of the progress bar and a position a half-width from the drag position after the pre-defined period.

As indicated, in some embodiments, the area to display the indicating image and other layers may be limited by the width of the progress indicator. When such limitations are taken into consideration, the actually area for display may be reduced. However, the descriptions for FIGS. 1A-C and FIGS. 2A-D are valid as close approximations for positioning the display of the indicating image and the layers of the indicators. With adjustment of half the width of the progress indicator, the descriptions for FIGS. 1A-C and FIGS. 2A-D can fit the needs of some more restrictive embodiments. In addition, in some embodiments it is not necessary to adjust the description for FIGS. 1A-C and FIGS. 2A-D when there is less limitation to the positioning of the progress indicator, e.g. the progress indicator can be positioned so that the progress indicator's center overlaps with the initiating position and the terminating position, and/or when the progress indicator is transparent and does not affect the display of the indicating image and the indicator layers.

Figure 4:
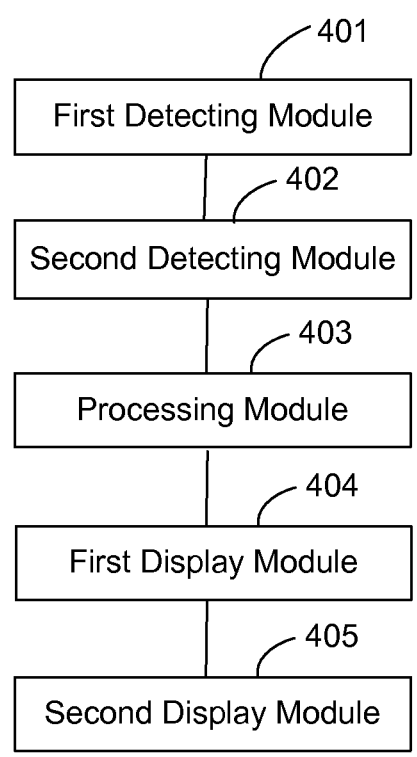
FIG. 4 is a block diagram illustrative of a computer system for the management of progress indicator display in accordance with some embodiments of the current application.
Figure 5:
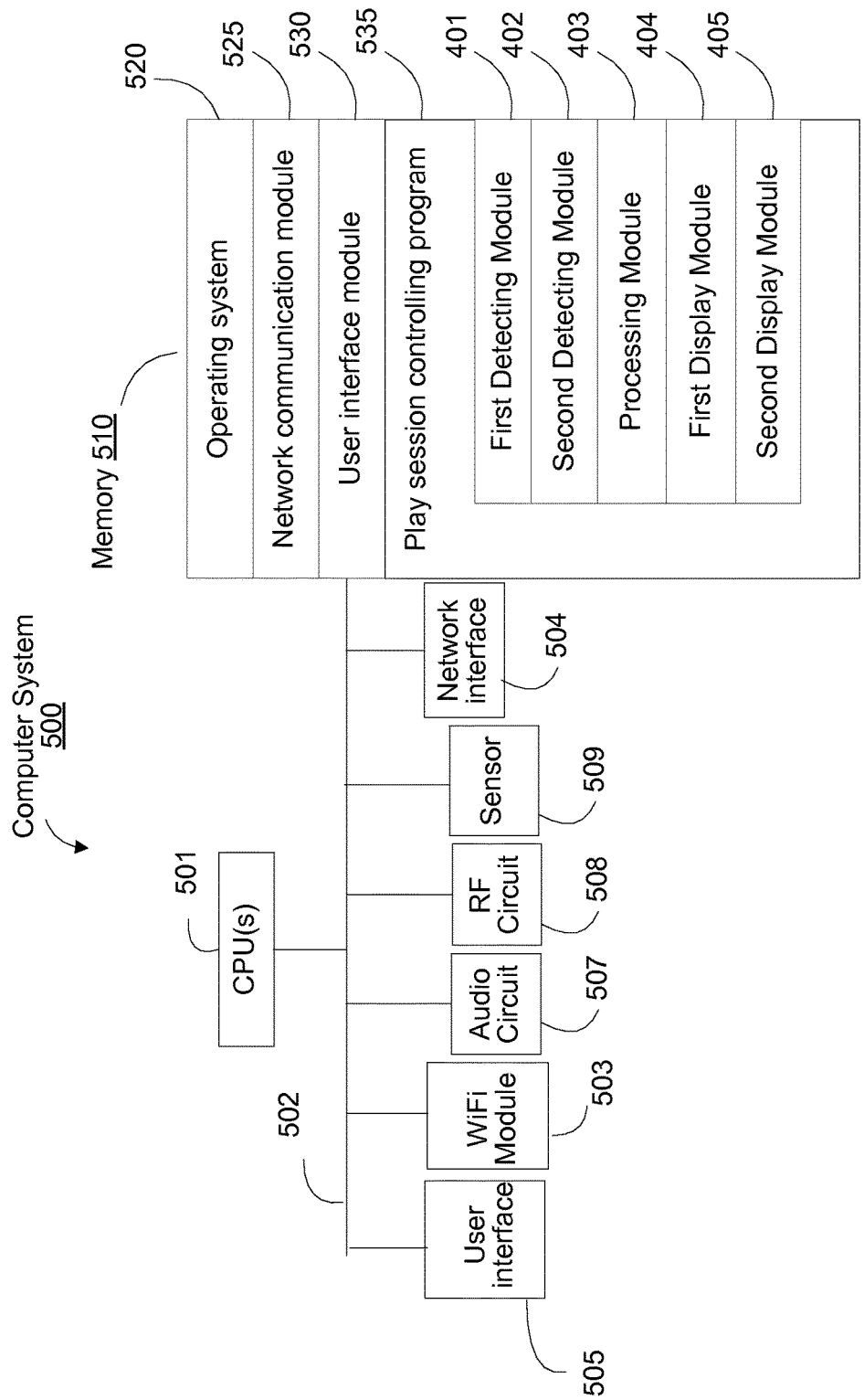
FIG. 5 is a schematic diagram of the computer system in accordance with some embodiments of the current application.

FIG. 4 and FIG. 5 illustrate the computer systems that may be used to perform the methods described above. To avoid redundancy, not all the details and variations described for the method are herein included for the devices. Such details and variations should be considered included for the description of the devices as long as they are not in direct contradiction to the specific description provided for the device.

FIG. 4 is a block diagram illustrative of a computer system for the management of progress indicator display in accordance with some embodiments of the current application. The computer system may comprise one or more processors, memory, and one or more programs modules stored in the memory and configured for execution by the one or more processors. In some embodiments, the one or more program modules may include a first detecting module 401, a second detecting module 401, a processing module 403, a first display module 404, and a second display module 405.

In some embodiments, the first detecting module 401 is configured to detect a starting position of the progress indicator along the progress bar and the respective positions of the one or more status indicators.

In some embodiments, the second detecting module 402 is configured to detect a drag operation to the progress indictor and a drag position of the progress indicator;

In some embodiments, the first display module 404 configured to display an indicating image between the starting position and the drag position in the progress bar for a pre-defined period of time when there is one or more respective positions of the status indicators between the starting position and the drag position, wherein the progress indicator has a corresponding progress layer and a drag layer and the one or more status indicators have respective corresponding status layer.

In some embodiments, the processing module 403 is configured to generate the indicating image by combining the drag layer and one or more status layers having corresponding status indicators with positions between the starting position and the drag position.

In some embodiments, the second display module 405 may be configured to display the progress layer between an initiating position of the progress bar and the drag position after the pre-defined period.

In some embodiments, the starting position is behind the position of a first indicator and the drag position is in front of the position of the first indicator, the indicating image comprises a first section between the starting position and the position of the first indicator and a second section between the position of the first indicator and the drag position, the first section of the indicating image is generated by overlaying the drag layer and the indicating layer corresponding to the first indicator, and the second section of the indicating image comprises the progress layer.

In some embodiments, the first display module 404 is further configured to display the drag layer between the initiating position of the progress bar and the starting position during the predefined period.

In some embodiments, the status indicator is a buffering indicator indicating data buffering progress for the play session. The computer system may further comprise a third display module configured to display a warning message indicating that progress indicator is surpassing the data buffering progress of the play session when the starting position is behind the position of the buffering indicator and the drag position is in front of the position of the buffering indicator.

In some embodiments, the progress indicator has a width, and the indicating image is not displayed when the distance between the starting position and the drag position is less than or equal to half the width.

In some embodiments, the drag layer is selected by a user of the computer system from a group of selectable layers.

FIG. 5 is a schematic diagram of the computer system in accordance with some embodiments of the current application. The computer system 500, e.g. a smart phone, typically includes one or more processing units (CPU's) 501, one or more network or other communications interfaces 504, memory 510, and one or more communication buses 502 for interconnecting these components. The communication buses 502 may include circuitry (sometimes called a chipset) that interconnects and controls communications between system components. The computer system 500 may also include an RF (Radio Frequency) circuit 508, sensors 509, an audio circuit 507, and a WiFi (Wireless Fidelity) module 503. The computer system 500 may include a user interface 505, e.g. a touch screen, which is both a display and an input device. Those skilled in the art may understand that the computer system 500 is not limited to the structures shown in FIG. 5, and it may comprise more or fewer parts than those in FIG. 5. In addition, some parts may be combined, or different arrangement of parts may be adopted therein.

The RF circuit 508 may be used for receiving and sending a signal during transferring of information or calling, and particularly may be used for sending information of from base station to one or more processors 501 for processing after receiving the downlink information, and sending uplink data to the base station. Generally, the RF circuit 508 comprises, but not limited to, an antenna, at least one amplifier, a tuner, one or more oscillators, an SIM (Subscriber Identity Module) card, a transceiver, a coupler, an LNA (Low Noise Amplifier), a duplexer and the like. Furthermore, the RF circuit 508 also can communicate with other equipment by wireless communication and/or the network. The wireless communication may be used with any communication standards or protocols which include, but not limited to, GSM (Global System of Mobile Communication), a GPRS (General Packet Radio Service), CDMA (Code Division Multiple Access), WCDMA (Wideband Code Division Multiple Access), LTE (Long Term Evolution), E-mail, and SMS (Short Messaging Service).

The user interface 505 may be used for receiving input number or character information and generating signal input related to user's setting and functional control, from keyboard, mouse, operating rod, optical or trackball. Particularly, the user interface may comprise a touch screen and other input equipment. The touch screen may also be named a touch control panel and may be used for detecting touch operations (for example, operations carried out by the user by using any suitable objects or attachments, such as a finger, a touch pen and the like, on the touch screen or near the touch screen) of the user on the touch screen or near the touch screen and driving corresponding apparatus connected therewith according to a preset program. In some embodiments, the touch screen may comprise a touch detection apparatus and a touch controller. The touch detection apparatus may be used for detecting the touch direction of the user, detecting a signal caused by the touch operation and transmitting the signal to the touch controller. The touch controller may be used for receiving the touch information from the touch detection apparatus, converting the touch information into contact coordinates and then sending the contact coordinates to the processor 501 and may also receive a command sent by the processor 501 and execute the command. Moreover, the touch screen may be implemented in various types such as a resistance type, a capacitance type, an infrared type, a surface acoustic wave type and the like. Besides the touch screen, the user interface 505 also may include other input equipments. Particularly, other input equipments may include, but not limited to, one or more of physical keyboards, virtual (function) keys (such as volume control key, switching key and the like), trackballs, mouse, operating rods and the like.

The computer system 500 also may include at least one sensor 509, such as optical sensors, motion sensors and other sensors. Particularly, the optical sensors may include an environmental light sensor and a proximity sensor. The environmental light sensor may regulate brightness of the touch screen according to the lightness of environmental light. The proximity sensor may shut down the touch screen and/or backlight when the computer system 500 is moved to the position near an ear. As one of the motion sensors, the gravity acceleration sensor may detect the value of an acceleration in each of the directions (generally, three directions or three axes), and may detect the value and the direction of gravity in a static state, which may be used for posture identifying functions (such as switching between a horizontal screen and a vertical screen, switching related to a game, and calibration on the posture of a magnetometer), vibration identifying functions (such as for pedometer and striking) and the like, in the computer system. Furthermore, a gyroscope, a barometer, a humidity meter, a thermometer, an infrared sensor and other sensors may be integrated into the computer system 500.

The audio circuit 507 may include a speaker and a microphone that can provide an audio interface between the user and the computer system 500. The audio circuit 507 may transmit an electric signal obtained by converting received audio data to the speaker. The electric signal is converted into a sound signal to be output by the speaker. On the other hand, the microphone converts a collected sound signal into an electric signal. The audio circuit 507 receives the electric signal and converts the electric signal into audio data. After the audio data is output to the processor 501 and is processed, it is sent, for example, to another computer system through the RF circuit 508, or is output to the memory 510 in order to be further processed. The audio circuit 507 also possibly includes an earphone jack for providing communication between an external earphone and the computer system 500.

WiFi belongs to the technology of short distance wireless transmission. With the WiFi module 503, the computer system 500 may help the user to receive and send emails, browse webpages, access streaming media and the like. The WiFi module 503 provides wireless broadband internet access for the user. Although the WiFi module 503 is shown in FIG. 5, it should be understood that the WiFi module 503 is not the necessary component of the computer system 500 and may be omitted as not required without change of the scope of the application.

The processor 501 is a control center of the computer system 500 and it is connected with the other parts of the computer system by various interfaces and lines and is used for executing various operations of the computer system 500 and processing the data by operating the software programs and/or the modules stored in the memory 510, and accessing the data stored in the memory 510 so as to carry out integral monitoring on the computer system. In some embodiments, the processor 501 may comprise one or more processing chips. In some embodiments, an application processor and a modulation-demodulation processor may be integrated into the processor 501, wherein the application processor is mainly used for the operating system, the user interface, applications and the like, and the modulation-demodulation processor is mainly used for wireless communication. It should be understood that the modulation-demodulation processor also may be not integrated into the processor 501.

The computer system 500 also includes the power supply (such as a battery) for supplying power to each part. In some embodiments, the power supply may be logically connected with the processor 501 by a power supply management system so as to implement functions of charge management, discharge management, power consumption management and the like by the power supply management system. The power supply also may include any components such as one or more DC (Direct Current) or AC (Alternating Current) power supplies, recharging systems, power supply fault detection circuits, power supply converters or inverters, power supply state indicators and the like.

The computer system 500 also may include a camera, a Bluetooth module and the like although they are not shown in FIG. 5.

Memory 510 may include high speed random access memory and may also include non-volatile memory, such as one or more magnetic disk storage devices. Memory 510 may include mass storage that is remotely located from the CPU's 501. In some embodiments, memory 510 stores the following programs, modules and data structures, or a subset or superset thereof:

- an operating system 520 that includes procedures for handling various basic system services and for performing hardware dependent tasks;
- a network communication module 525 that is used for connecting the computer system 500 to other computers via one or more communication networks (wired or wireless), such as the Internet, other wide area networks, local area networks, metropolitan area networks, and so on;
- a user interface module 530 configured to receive user inputs through the user interface 505;
- and a number of play session controlling module 535 including the following:
- a first detecting module 401 configured to detect a starting position of the progress indicator along the progress bar and the respective positions of the one or more status indicators;
- a second detecting module 402 configured to detect a drag operation to the progress indictor and a drag position of the progress indicator;
- a first display module 404 configured to display an indicating image between the starting position and the drag position in the progress bar for a pre-defined period of time when there is one or more respective positions of the status indicators between the starting position and the drag position, wherein the progress indicator has a corresponding progress layer and a drag layer and the one or more status indicators have respective corresponding status layer;
- a processing module 403 configured to generate the indicating image by combining the drag layer and one or more status layers having corresponding status indicators with positions between the starting position and the drag position; and
- a second display module 405 configured to display the progress layer between an initiating position of the progress bar and the drag position after the pre-defined period.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

What is claimed is:

1. A method for displaying play session progress status, comprising:
    at a computer system having one or more processors and memory storing programs executed by the one or more processors and displaying a progress indicator and one or more status indicators positioned on a progress bar for a play session,
        detecting a starting position of the progress indicator along the progress bar and the respective positions of the one or more status indicators;

detecting a drag operation to the progress indictor and a drag position of the progress indicator;

displaying an indicating image between the starting position and the drag position in the progress bar for a pre-defined period of time when there is one or more respective positions of the status indicators between the starting position and the drag position, wherein the progress indicator has a corresponding progress layer and a drag layer and the one or more status indicators have respective corresponding status layers, and the indicating image is generated by combining the drag layer and one or more status layers having corresponding status indicators with positions between the starting position and the drag position; and displaying the progress layer between an initiating position of the progress bar and the drag position after the pre-defined period.

2. The method of claim 1, wherein:
the starting position is behind the position of a first indicator and the drag position is in front of the position of the first indicator,
the indicating image comprises a first section between the starting position and the position of the first indicator and a second section between the position of the first indicator and the drag position,
the first section of the indicating image is generated by overlaying the drag layer and the indicating layer corresponding to the first indicator, and
the second section of the indicating image comprises the progress layer.

3. The method of claim 2, further comprising:
displaying the drag layer between the initiating position of the progress bar and the starting position during the predefined period.

4. The method of claim 1, wherein:
one of the status indicators is a buffering indicator indicating data buffering progress for the play session.

5. The method of claim 4, wherein:
when the starting position is behind the position of the buffering indicator and the drag position is in front of the position of the buffering indicator, displaying a warning message indicating that progress indicator is surpassing the data buffering progress of the play session.

6. The method of claim 1, wherein:
the progress indicator has a width, and the indicating image is not displayed when the distance between the starting position and the drag position is less than or equal to half the width.

7. The method of claim 1, wherein:
the drag layer is selected by a user of the computer system from a group of selectable layers.

8. The method of claim 1, wherein:
the progress layer and the one or more status layers are combined by conducting one or more of the operations: selecting, overlaying, fusing, color mixing, pattern mixing, paralleling, adjusting contrast, feathering, adjusting sharpness, adjusting transparency, removing, rotating, adjusting size, changing color, and adding text.

9. The method of claim 1, wherein:
the predefined period is the period when the drag operation is being conducted.

10. A computer system displaying a progress indicator and one or more status indicators positioned on a progress bar for a play session, the computer system comprising:
one or more processors;
memory; and
one or more programs modules stored in the memory and configured for execution by the one or more processors, the one or more program modules including:
a first detecting module configured to detect a starting position of the progress indicator along the progress bar and the respective positions of the one or more status indicators;
a second detecting module configured to detect a drag operation to the progress indictor and a drag position of the progress indicator;
a first display module configured to display an indicating image between the starting position and the drag position in the progress bar for a pre-defined period of time when there is one or more respective positions of the status indicators between the starting position and the drag position, wherein
the progress indicator has a corresponding progress layer and a drag layer and the one or more status indicators have respective corresponding status layers, and
the indicating image is generated by combining the drag layer and one or more status layers having corresponding status indicators with positions between the starting position and the drag position; and
a second display module configured to display the progress layer between an initiating position of the progress bar and the drag position after the pre-defined period.

11. The computer system of claim 10, wherein
the starting position is behind the position of a first indicator and the drag position is in front of the position of the first indicator,
the indicating image comprises a first section between the starting position and the position of the first indicator and a second section between the position of the first indicator and the drag position,
the first section of the indicating image is generated by overlaying the drag layer and the indicating layer corresponding to the first indicator, and
the second section of the indicating image comprises the progress layer.

12. The computer system of claim 11, wherein:
the first display module is further configured to display the drag layer between the initiating position of the progress bar and the starting position during the pre-defined period.

13. The computer system of claim 10, wherein:
one of the status indicators is a buffering indicator indicating data buffering progress for the play session.

14. The computer system of claim 13, further comprising:
a third display module configured to display a warning message indicating that progress indicator is surpassing the data buffering progress of the play session when the starting position is behind the position of the buffering indicator and the drag position is in front of the position of the buffering indicator.

15. The computer system of claim 10, wherein:
the progress indicator has a width, and the indicating image is not displayed when the distance between the starting position and the drag position is less than or equal to half the width.

16. The computer system of claim 10, wherein:
the drag layer is selected by a user of the computer system from a group of selectable layers.

17. The computer system of claim 10, further comprising:
a processing layer configured to combine the progress layer and one or more status layers, wherein the progress layer and one or more status layers are combined by conducting one or more of the operations: selecting, overlaying, fusing, color mixing, pattern mixing, paralleling, adjusting contrast, feathering, adjusting sharpness, adjusting transparency, removing, rotating, adjusting size, changing color, and adding text.

18. The computer system of claim 10, wherein:
the predefined period is the period when the drag operation is being conducted.

19. A non-transitory computer readable storage medium having stored therein one or more instructions, which, when executed by a computer system displaying a progress indicator and one or more status indicators positioned on a progress bar for a play session, cause the computer system to:
detect a starting position of the progress indicator along the progress bar and the respective positions of the one or more status indicators;
detect a drag operation to the progress indictor and a drag position of the progress indicator;
display an indicating image between the starting position and the drag position in the progress bar for a pre-defined period of time when there is one or more respective positions of the status indicators between the starting position and the drag position, wherein
the progress indicator has a corresponding progress layer and a drag layer and the one or more status indicators have respective corresponding status layers, and
the indicating image is generated by combining the drag layer and one or more status layers having corresponding status indicators with positions between the starting position and the drag position; and
display the progress layer between an initiating position of the progress bar and the drag position after the pre-defined period.

20. The non-transitory computer readable storage medium of claim 19, wherein
the starting position is behind the position of a first indicator and the drag position is in front of the position of the first indicator,
the indicating image comprises a first section between the starting position and the position of the first indicator and a second section between the position of the first indicator and the drag position,
the first section of the indicating image is generated by overlaying the drag layer and the indicating layer corresponding to the first indicator, and
the second section of the indicating image comprises the progress layer.

* * * * *